United States Patent [19]

Robinson et al.

[11] Patent Number: 4,462,450

[45] Date of Patent: Jul. 31, 1984

[54] ADAPTER FOR A TIRE BEAD LOOSENING TOOL

[75] Inventors: Allan J. Robinson, Kent; William T. Smith, Uniontown, both of Ohio

[73] Assignee: The Goodyear Tire & Rubber Company, Akron, Ohio

[21] Appl. No.: 557,373

[22] Filed: Dec. 1, 1983

Related U.S. Application Data

[63] Continuation of Ser. No. 348,532, Feb. 12, 1982, abandoned.

[51] Int. Cl.³ .............................................. B60C 25/00
[52] U.S. Cl. ...................................................... 157/1
[58] Field of Search ............................ 157/1, 1.1, 1.17

[56] References Cited

U.S. PATENT DOCUMENTS

| | | | |
|---|---|---|---|
| 913,897 | 3/1909 | James | 157/1.17 |
| 2,122,388 | 6/1938 | Wilkerson | 157/1.17 |
| 2,548,033 | 4/1951 | Madden | 157/1.17 |
| 2,743,767 | 5/1956 | Martin | 157/1.00 |
| 3,574,318 | 4/1971 | Gerbeth et al. | 157/1.17 |

Primary Examiner—James G. Smith
Attorney, Agent, or Firm—L. R. Drayer

[57] ABSTRACT

An adapter, to facilitate the use of a bead-loosening tool for demounting a tire mounted on a wheel-rim, has a base plate with a slot therethrough through which the force-transmitting and flange-engaging means of a bead-loosening tool may extend. One surface of the adapter presents a configuration that is complementary to the configuration presented by an axially outer end of a wheel-rim. The foregoing abstract is not to be taken as limiting the invention of this application, and in order to understand the full nature and extent of the technical disclosure of this application, reference must be made to the accompanying drawings and the following detailed description.

6 Claims, 5 Drawing Figures

ADAPTER FOR A TIRE BEAD LOOSENING TOOL

This is a continuation of application Ser. No. 348,532 filed Feb. 12, 1982, now abandoned.

BACKGROUND OF THE INVENTION

This invention relates to an adaptor designed to facilitate the use of a tire bead-loosening tool.

Bead-loosening tools of the type described in U.S. Pat. No. 3,574,318, issued to G. L. Gerbeth et al, and U.S. Pat. No. 3,880,220, issued to H. A. Bunts, and similar bead-loosening tools are operated by fluid-powered mechanisms. Such bead-loosening tools are intended to be used primary for demounting tires used on earthmovers and other large vehicles, mounted on specially designed wheel-rims such as those disclosed in the above-cited patents. However, the introduction of new wheel-rim designs may render the use of such bead-loosening tools difficult, even though the new designs are only slightly different from those with which the bead-loosening tools were designed to be used.

It is a primary object of this invention to provide an adapter that will facilitate the use of a bead-loosening tool designed primarily for use with one type of wheel-rim, with another type of wheel-rim.

DETAILED DESCRIPTION OF THE INVENTION

Figure 1:
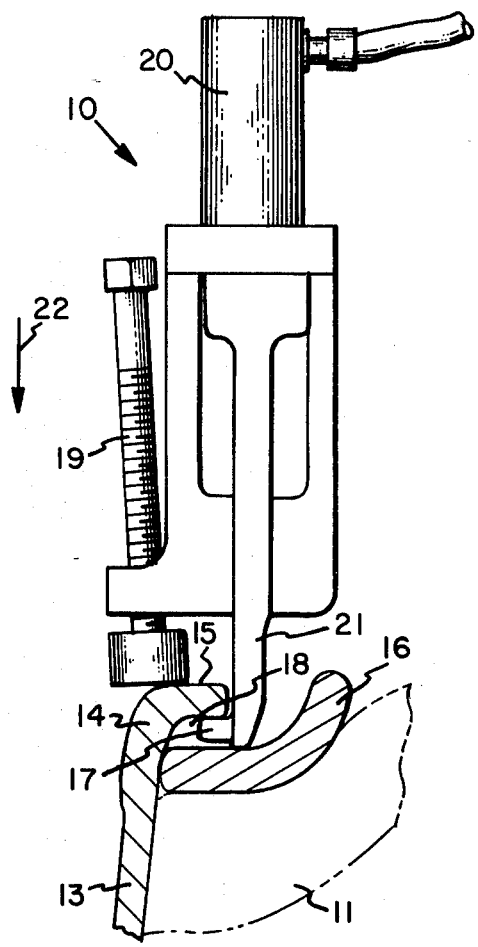
FIG. 1 is a plan view, partially in section, of a bead-loosening tool in its operative position for demounting a tire.

FIG. 1 is a plan view, partially in section, showing a bead-loosening tool 10, such as that described in U.S. Pat. Nos. 3,574,318 and 3,880,220, in its operative position for demounting the bead portion of a tire 11, shown in phantom, mounted on a wheel-rim. Tire bead-loosening tool 10, was designed to be used primarily with a wheel-rim of the type shown in FIG. 1. The portion of the wheel-rim which is shown, in section, in FIG. 1 is commonly known in the art as the "back section", and consists of an endless rim base 13 having a side-retaining flange 14 extending outwardly along one edge thereof. Side-retaining flange 14 presents a configuration that is substantially a flat surface at its axial end 15. An endless flange side ring 16 is interposed between the bead portion of the tire 11 and the side-retaining flange 14.

The bead portion of a tire of the type used on trucks, busses, tractors, earthmovers, and airplanes, is very heavy and stiff, and after an extended period of service, corrosion of the wheel-rim, heat generated by the flexing of the inflated tire, and heat transmitted from brake drums may cause the bead portion of the tire to become firmly adhered to the wheel-rim. When it becomes necessary to demount the tire from the wheel-rim, a large amount of force is required to loosen the bead portion of the tire from the wheel-rim if an adherence has occurred. Bead-loosening tools, often activated by fluid-powered mechanisms, have been designed to aid in the demounting procedure. The bead-loosening tool 10 is manipulated into its operative position by inserting its flange-engaging means 17, hereafter referred to as a hook, into a specially designed offset 18 of the retaining flange 14, and then tightening the means for securing the bead-loosening tool in an operative position 19, which in FIG. 1 is a pressure bolt, against the substantially flat surface presented by the axial end 15 of the side-retaining flange 14. For purposes of this invention "axial" and "axially" shall refer to the axis of rotation of a wheel-rim and any tire mounted thereon. The mid-circumferential centerplane of the tire mounted on the wheel is a plane perpendicular to the axis of rotation of the wheel-rim and tire, located midway between the sidewalls of the tire. For purposes of describing this invention, "axially inner" and "axially inward" shall indicate a direction going from an axial end of the wheel-rim towards the mid-circumferential centerline of a tire mounted thereon, and "axially outer" and "axially outward" shall indicate a direction going from the mid-circumferential centerplane of the tire toward an axial end of the wheel-rim. The fluid-powered mechanism 20 is the bead-loosening tool's means for generating a demounting force. The demounting force is transmitted by a force-transmitting means 21, hereafter referred to as the "clevis", to displace the side ring 16 and the bead portion of the tire 11. It is preferred that to maximize the efficiency of the bead-loosening tool 10, the operative position of the bead-loosening tool be such that the demounting force being transmitted to the side ring 16 is in a direction, as represented by arrow 22, that is parallel to the axis of rotation of the wheel-rim and tire.

Figure 3:
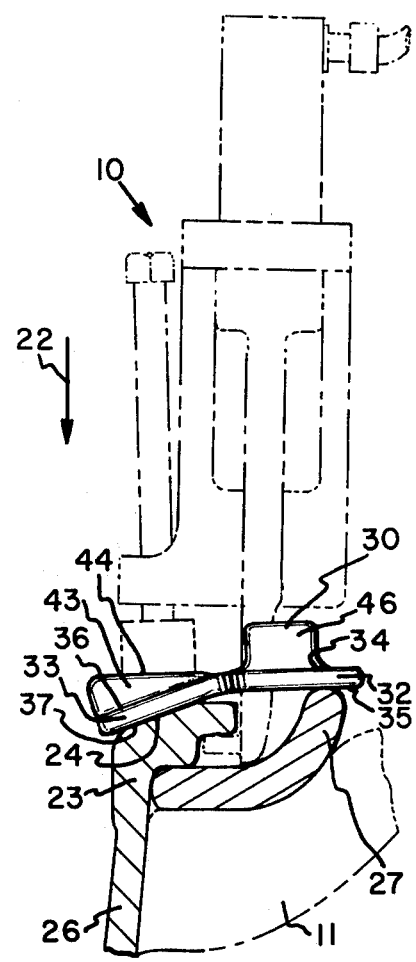
FIG. 3 is a plan view, partially in section, of the adapter of FIG. 2 in its operative position.

Referring to FIG. 3, it will be readily apparent to one skilled in the art that the pressure bolt 19 of the bead-loosening tool 10, shown in phantom, cannot properly seat against the tapered side-retaining flange 23, which presents a contour at its axial end 24 that is not flat like that of side-retaining flange 14 shown in FIG. 1. The purpose of the design of the tapered side-retaining flange 23 is to provide a "back section" that is stronger than that of the wheel-rim shown in FIG. 1, with a minimal increase in the weight of the wheel-rim.

Adapter 30 is one embodiment of this invention which facilitates the use of the bead-loosening tool 10 with a wheel-rim presenting a configuration that is not flat at its axial end 24. The adapter 30 provides a surface substantially perpendicular to the securing force exerted by the pressure bolt 19, and helps to direct the demounting force exerted by the fluid-powered mechanism 20 and transmitted through the clevis 21.

The wheel-rim shown in FIG. 3 consists of an endless rim base 26 having a tapered side-retaining flange 23 extending outwardly along one edge thereof. An endless flange side ring 27 telescopes over the rim base 26 and is interposed between the tapered side-retaining flange 23 and the bead portion of a tire 11, shown in phantom, to retain the bead portion of the tire in position on the wheel-rim in the same manner as it would be retained on the wheel-rim shown in FIG. 1. The bead-loosening tool is maintained in substantially the same operative position as in FIG. 1, with the demounting force being transmitted to the side ring in a direction, as represented by arrow 22, that is parallel to the axis of rotation of the wheel-rim and tire through the use of the adapter 30.

Figure 2:
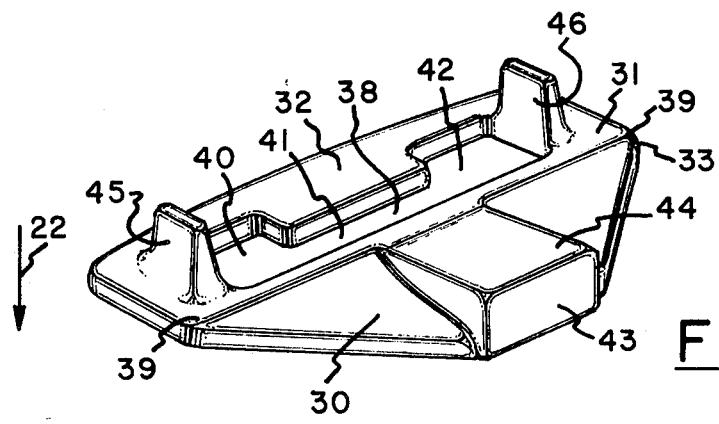
FIG. 2 is a perspective view of an adapter made in accordance with one embodiment of the invention.

Referring now to FIG. 2 and FIG. 3, the adapter 30, which is one embodiment of the invention, consists of a base plate 31 having a first portion 32 and a second portion 33. The first portion 32 has an axially outer surface 34 and an axially inner surface 35 which are substantially flat and parallel to one another. The axially outer and inner surfaces 34 and 35 of the first portion 32 of the base plate 31 are substantially perpendicular to the axis of rotation of the tire and wheel-rim when the adapter is in its operative position. The exact configuration of the flange side ring 27 may cause the first portion of the base plate to vary slightly from the desired perpendicular relationship without having a detrimental effect upon the operation of the bead-loosening tool. The second portion 33 of the base plate 31 has an axially outer surface 36 and an axially inner surface 37. In this embodiment of the invention, the axially outer surface 36 and the axially inner surface 37 of the second portion are flat and substantially parallel to each other, with the second portion being inclined at an angle with respect to the first portion of the base plate. It will be evident from the following descriptions of the other embodiments of the invention that this angular relationship between the first and second portions of the base plate is not a limiting characteristic of the invention. However, in the embodiment of the invention shown in FIG. 2 and FIG. 3, the angular relationship between the first and second portions of the base plate is necessary in order that the axially inner surface 37 of the second portion 33 may present a configuration that is complementary to the configuration presented by the axially outer end 24 of the side-retaining flange 23 when the adapter 30 is in its operative position.

The first portion 32 of the base plate 31 has a slot 38 therethrough, through which the hook and clevis of the bead-loosening tool 10 may extend. The intersection 39 of the first and second portions 32 and 33 of the base plate is substantially parallel to the longest side of the slot 38. The length of the slot 38 may be divided into a plurality of sections, 40,41,42 with the width of the slot in each section being different from the width of the next adjacent section, or sections to accommodate the dimensions of the hook and clevis of the bead-loosening tool. In this embodiment, the wider end sections 40 and 42 facilitate the passage of the clevis through the slot 38, and the narrower central section 41 not only facilitates the passage of the hook through the slot, but also transmits the securing force exerted by the pressure bolt 19 to the hook, to further aid in maintaining the adapter 30 and the bead-loosening tool 10 in their operative positions. Of course, the exact configuration of the slot 38 may be changed to facilitate the use of the adapter with bead-loosening tools of various designs without deviating from the spirit of this invention.

While the axially outer surface 36 of the second portion 33 of the base plate 31 has been shown inclined at an angle with respect to the axially outer surface of the first portion of the base plate, the axially outer surface of the second portion could have been shown as being substantially an extension of the axially outer surface 34 of the first portion of the base plate. The embodiment shown in FIG. 2 and FIG. 3, however, allows the adapter to be made with a lower weight, and at a lower cost, by having pad 43 extending from the axially outer surface of the second portion and presenting a flat surface 44 that is substantially an extension of the axially outer surface 34 of the first portion 32. The pressure bolt of the bead-loosening tool is tightened against the flat surface 44 presented by the pad 43 to secure the bead-loosening tool 10 and adapter 30 in their operative positions, in a vise-like manner between the hook and pressure bolt, with respect to the tire 11 and wheel-rim. In the event that the axis of the pressure bolt 19 is not parallel to the axis of rotation of the tire 11 and wheel-rim, the flat surface 44 presented by the pad may be inclined at an angle with respect to the axially outer surface of the first portion of the base plate, such that the flat surface is substantially perpendicular to a securing force exerted by the pressure bolt 19.

Two stop plates 45 and 46 extend perpendicularly outward from the axially outer surface 34 of the first portion 32 of the base plate, with one stop plate being located at each end of the slot 38. The stop plates further aid in maintaining the adapter in its operative position relative to the clevis and hook of the bead-loosening tool that extend through the slot, especially when the bead-loosening tool and adapter combination is moved from one location to another.

An adapter may be manufactured according to the invention from any suitable material, preferably metal, and has been manufactured most efficiently by forging, although it could also be manufactured by casting or stamping processes.

A pneumatic tire mounted on a wheel-rim may be demounted by using an adapter manufactured in accordance with this invention with any bead-loosening tool having a means for generating a demounting force, a force-transmitting means, a flange-engaging means, and a means for securing the bead-loosening tool in an operative position. The first step in demounting the tire is to deflate the tire, then extend the force-transmitting and flange-engaging means of the bead-loosening tool through the slot of the adapter. The flange-engaging means of the bead-loosening tool are then positioned in an offset of the side-retaining flange of the wheel-rim and the means for securing the bead-loosening tool in an operative position is tightened against the axially outer surface of the adapter, to maintain the adapter and bead-loosening tool in an operative position. The operative position of the bead-loosening tool and the adapter should be such that the bead demounting force being transmitted to the side ring of the wheel-rim is in a direction parallel to the axis of rotation of the wheel-rim and tire. The means for generating the demounting force is then activated, and the force-transmitting means is allowed to transmit the demounting force thus generated to the side ring of the wheel-rim. The bead-loosening tool and adapter should be successively positioned in a number of locations around the circumference of the side-retaining flange, and secured into position while the demounting force is transmitted to the side ring, with the number of locations dependent upon the size of the wheel-rim and the degree of adhesion that has occurred between the tire and the wheel-rim. By using an adapter manufactured according to the invention, it is conveniently possible to move the tire bead-loosening tool from one location to another around the circumference of the wheel-rim without separating the combination of adapter and the tire bead-loosening tool.

Figure 4:
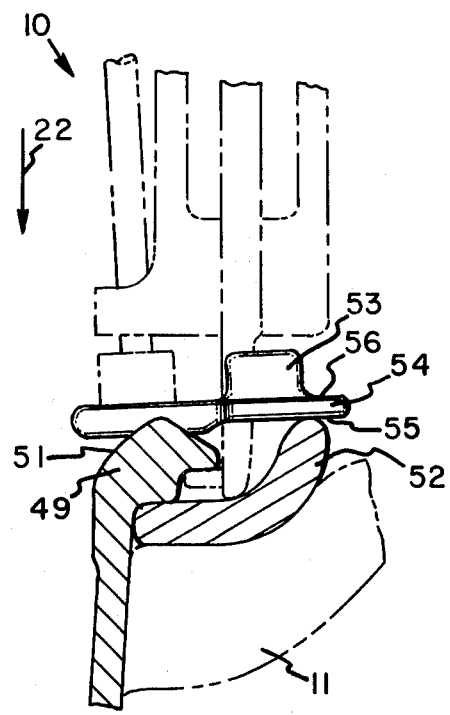
FIG. 4 is a plan view, partially in section, of a second embodiment of the invention.

A second embodiment of the invention is shown in FIG. 4, wherein the side-retaining flange 49 of the wheel-rim presents a configuration having two tapered surfaces at its axial end 51. The endless flange side ring 52 is interposed between the tire 11, shown in phantom, and the side-retaining flange 49 in the same manner described above. Adapter 53, is shown in its operative position facilitating the use of a bead-loosening tool 10, shown in phantom. This embodiment of the invention has a base plate 54 with axially inner 55 and outer 56 surfaces, with respect to the axis of rotation of the wheel-rim and tire when the adapter is in its operative position. The axially inner and outer surfaces of the base plate are substantially parallel, with the axially inner surface 55 presenting a configuration that is complementary to the configuration presented by the axially outer end 51 of the side-retaining flange of the wheel-rim. The base plate has a slot therethrough, through which force-transmitting and flange-engaging means of the bead-loosening tool may extend.

Other features of the first embodiment, such as the stop plates and sections of different widths along the length of the slot may be incorporated in this second embodiment to aid in retaining the adapter in position with respect to the bead-loosening tool as it is moved from one location to another, but are not essential to its function.

Figure 5:
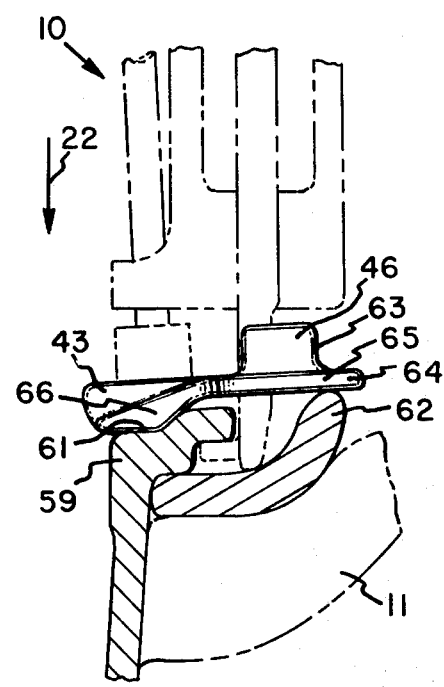
FIG. 5 is a plan view, partially in section, of a third embodiment of the invention.

FIG. 5 is a plan view, partially in section, of a third embodiment of the invention, wherein the side-retaining flange 59 of a wheel-rim presents a configuration at its axially outer end 61 that has three surfaces having angular relationships to each other. The endless flange side ring 62 is interposed between the tire 11, shown in phantom, and the side-retaining flange 59 in the same manner described above. Adapter 63 is shown in its operative position facilitating the use of a bead-loosening tool 10, shown in phantom. The first portion 64 of the base plate 65 of the adapter has substantially the same structure as the first portion 31 shown in FIGS. 2 and 3, including the slot 38 and the stop plates 45 and 46. The second portion 66 of the base plate has an axially inner surface that is contoured to present a configuration complementary to the configuration presented by the axial end of the side-retaining flange. Depending upon the exact configuration of the "back section" of the wheel-rim, the second portion of the base plate of the adapter made in accordance with this embodiment of the invention may be offset at an angle with respect to the first portion and have a pad 43 extending therefrom as shown in FIG. 2, FIG. 3, and FIG. 5, or it could have its axially outer surface shown as being substantially an extension of the axially outer surface of the first portion of the base plate, as is shown in FIG. 4.

While certain representative embodiments and details have been shown for the purpose of illustrating the invention, it will be apparent to those skilled in the art that various changes and modifications may be made therein without departing from the spirit or scope of the invention.

We claim:

1. An adapter for use with a bead-loosening tool for demounting a tire mounted on a wheel-rim, said adapter comprising a base plate having axially inner and outer surfaces, with respect to the axis of rotation of said wheel-rim and said tire when the adapter is in its operative position, said axially inner and outer surfaces being substantially parallel to one another, said axially inner surface presenting a configuration that is complementary to the configuration presented by an axially outer end of a side-retaining flange of said wheel-rim, said base plate having a completely enclosed elongated slot therethrough through which force-transmitting and flange-engaging means of said bead-loosening tool may extend, said slot being divided into a plurality of sections along its length with the width of each section being different from the width of the next adjacent section, or sections.

2. An adapter as described in claim 1, further characterized in that said base plate is divided into first and second portions, each said portion having axially inner and outer surfaces, said second portion being inclined at an angle with respect to said first portion, said slot being through said first portion, the intersection of said first and second portions being substantially parallel to the longest side of said slot, said complementary configuration being presented by the axially inner surface of said second portion, and further comprising a pad extending from the axially outer surface of said second portion, said pad presenting a flat surface that is substantially an extension of the axially outer surface of said first portion.

3. An adapter as described in claim 2, wherein the flat surface presented by said pad is inclined at an angle with respect to the axially outer surface of said first portion of said base plate such that said flat surface is substantially perpendicular to a securing force exerted by a means for securing said bead-loosening tool in an operative position.

4. In combination, a wheel-rim, a tire mounted on said wheel-rim, a bead-loosening tool, and an adapter for said bead-loosening tool:
 (a) said wheel-rim having a side-retaining flange and a side ring;
 (b) said bead-loosening tool having a means for generating a demounting force, a force-transmitting means, a flange-engaging means, and a means for securing said bead-loosening tool in an operative position with respect to said wheel-rim; and
 (c) said adapter comprising a base plate having axially inner and outer surfaces, with respect to the axis of rotation of said wheel-rim and tire when said adapter is in its operative position, said axially inner and outer surfaces being substantially parallel, said axially inner surface presenting a configuration that is complementary to the configuration presented by an axially outer end of a side-retaining flange of said wheel-rim, and said base plate having a slot therethrough through which the force-transmitting and flange-engaging means of said bead-loosening tool extend, said flange-engaging means being inserted into an offset of said side-retaining flange and said means for securing being tightened against said axially outer surface to maintain said adapter and bead-loosening tool in an operative position.

5. A method of demounting a pneumatic tire mounted on a wheel-rim using a bead-loosening tool and an adapter for said bead-loosening tool;
 said wheel-rim having a side-retaining flange and a side ring;
 said bead-loosening tool having a means for generating a demounting force, a force-transmitting means, a flange-engaging means, and a means for securing said bead-loosening tool in an operative position;
 and said adapter comprising a base plate having axially inner and outer surfaces, with respect to the axis of rotation of said wheel-rim and tire when said adapter is in its operative position, said axially inner and outer surfaces being substantially parallel, said axially inner surface presenting a configuration that is complementary to the configuration presented by an axially outer end of said side-retaining flange, said base plate having a slot therethrough;

said method comprising the steps of:
(a) deflating said tire;
(b) extending the force-transmitting and flange-engaging means of said bead-loosening tool through said slot in said adapter;
(c) successively positioning the flange-engaging means of the bead-loosening tool in an offset of said side-retaining flange in a number of locations around the circumference of said side-retaining flange;
(d) tightening the means for securing said bead-loosening tool in an operative position against the axially outer surface of said adapter, to maintain the adapter and bead-loosening tool in an operative position at each said location; and
(e) activating the means for generating a demounting force at each said location, and allowing the force-transmitting means to transmit the demounting force thus generated to the side ring of said wheel-rim at each said location.

6. A method of demounting a tire as described in claim 5, wherein the operative position of said bead-loosening tool and said adapter is characterized by the bead demounting force being transmitted to said side ring in a direction substantially parallel to the axis of rotation of said wheel-rim and tire.

* * * * *